(12) United States Patent
Paulraj et al.

(10) Patent No.: US 12,541,414 B2
(45) Date of Patent: Feb. 3, 2026

(54) MANAGING USE OF CHANNEL CARDS WITH NON-STANDARD FUNCTIONS USING AN ERROR MESSAGE PARSER

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,263

(22) Filed: Jul. 26, 2024

(65) Prior Publication Data

US 2026/0030086 A1    Jan. 29, 2026

(51) Int. Cl.
*G06F 11/07* (2006.01)
(52) U.S. Cl.
CPC ...... *G06F 11/0772* (2013.01); *G06F 11/0709* (2013.01); *G06F 11/079* (2013.01); *G06F 11/0793* (2013.01)
(58) Field of Classification Search
CPC ............. G06F 11/0772; G06F 11/0709; G06F 11/079; G06F 11/0793
See application file for complete search history.

(56) References Cited

U.S. PATENT DOCUMENTS

| | | | |
|---|---|---|---|
| 7,974,286 B2 | 7/2011 | Keohane et al. | |
| 11,734,299 B2 * | 8/2023 | Alavi | G06F 16/258 707/756 |
| 2012/0143616 A1 * | 6/2012 | Pulak | G06Q 30/06 705/1.1 |

(Continued)

FOREIGN PATENT DOCUMENTS

WO    WO-2015101143 A1 *  7/2015  .......... G06F 11/0769

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

(Continued)

*Primary Examiner* — Jigar P Patel
(74) *Attorney, Agent, or Firm* — WOMBLE BOND DICKINSON (US) LLP

(57) ABSTRACT

Methods and systems for managing operations of a data processing system are disclosed. To manage operations of the data processing system, a non-standard error message may be obtained from a channel card, which may be associated with a non-standard function of the channel card. The non-standard error message may be modified using an error message parser obtained from the channel card and may be based on the non-standard function to obtain a standard error message. The error message parser may include mappings between non-standard error messages and standard error messages. A unified log may be obtained using at least the standard error message which may include data regarding the operation of the data processing system and may be based on a master clock of the data processing system. The unified log may be provided to a diagnostic system responsible for determining a root cause for the non-standard error message.

20 Claims, 6 Drawing Sheets

(56) References Cited

U.S. PATENT DOCUMENTS

2023/0252485 A1* 8/2023 Sampath ................ G06F 40/30

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).
Rostami, Mohamadreza, et al. "Beyond random inputs: A novel ml-based hardware fuzzing." 2024 Design, Automation & Test in Europe Conference & Exhibition. IEEE. (2024) (6 Pages).
Gaikwad, Pravin, et al. "Third-party hardware IP assurance against Trojans through supervised learning and post-processing." arXiv preprint arXiv:2111.14956. IEEE. (2021) (13 Pages).

* cited by examiner

MANAGING USE OF CHANNEL CARDS WITH NON-STANDARD FUNCTIONS USING AN ERROR MESSAGE PARSER

FIELD

Embodiments disclosed herein relate generally to managing operation of a data processing system. More particularly, embodiments disclosed herein relate to systems and methods to manage use of channel cards with non-standard functions using an error message parser.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
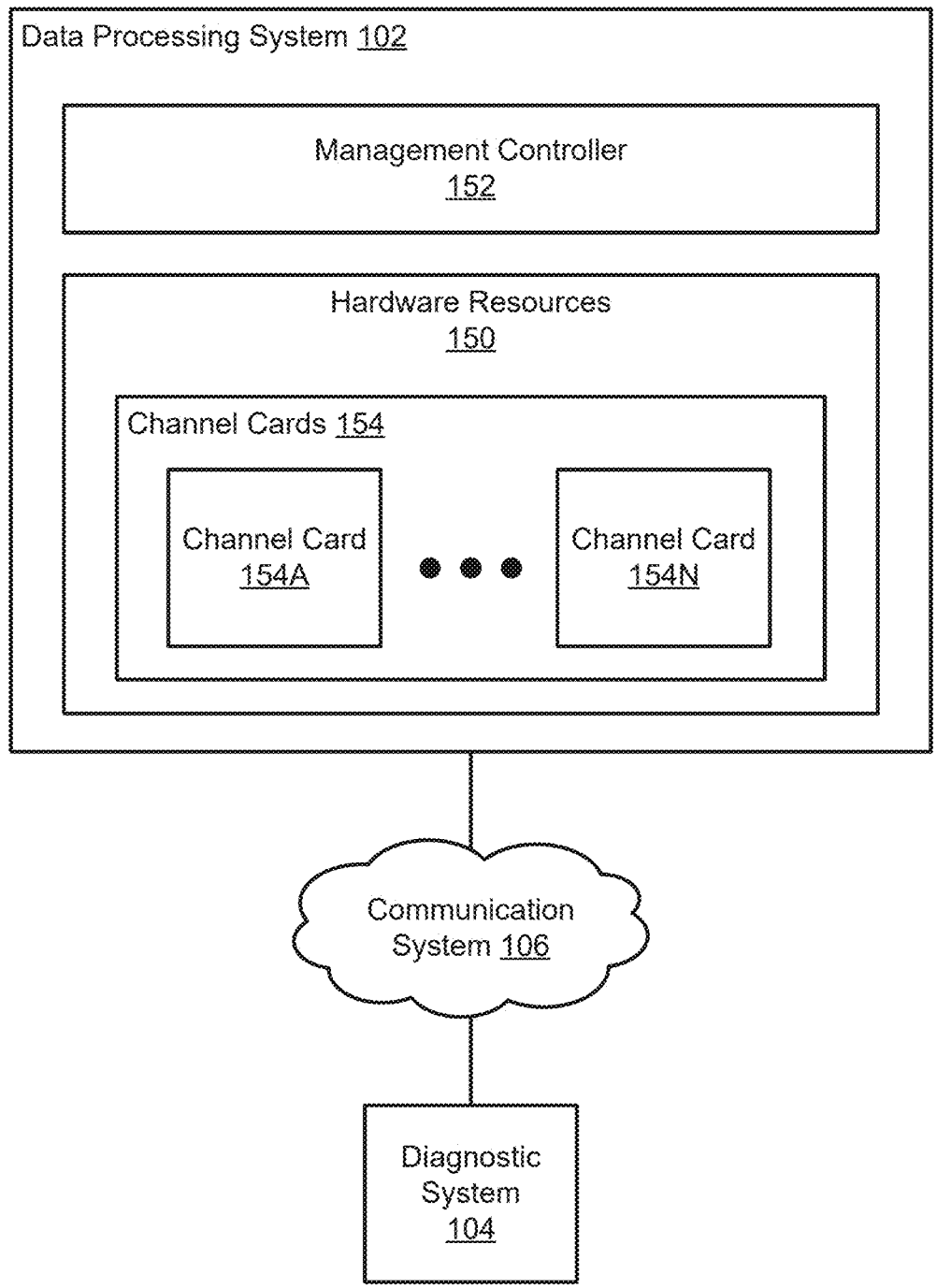
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, etc. may perform desired functions.

While performing their functions, the hardware resources may experience errors, resulting in the generation of error messages. The error messages may be provided to a management entity of the data processing system, such as a management controller. The management controller may generate a unified log, which may include an aggregated list of error messages and corresponding timestamps from the hardware resources. The unified log may provide a global view of the operation of the data processing system and may be used by a diagnostic system (e.g., a remote entity which provides diagnostic and/or other management services for the data processing system) to determine a root cause for the error messages.

To generate the unified log, the management controller may be prepared during manufacturing to include firmware, drivers, and/or configuration settings that enable the management controller to read and/or otherwise understand error messages generated by hardware resources included in the data processing system at the time of manufacturing (e.g., stock hardware components).

Over time (e.g., after an end user obtains the data processing system from the manufacturer), stock hardware components of the data processing system may be modified. For example, portions of the stock hardware components may be replaced, added, removed, and/or otherwise modified to improve performance of the data processing system.

For example, a user may replace a stock channel card (e.g., a graphics card, a sound card, a storage card) of the data processing system with a channel card with non-standard functions. The channel card with non-standard functions may include capabilities to perform standard functions (e.g., known functionality, based on a current or preceding industry standard with which the replacement channel card is compliant) as well as non-standard functions. The non-standard functions may be additional to those of the industry standard and may not be known by the management controller. Therefore, the management controller may not be configured to read and/or otherwise understand error messages associated with the non-standard functions (e.g., non-standard error messages). Consequently, the management controller may be unable to include the non-standard error messages in the unified log (e.g., in a manner that is comprehendible and/or usable by entities such as the management controller and/or the diagnostic system).

In order to include the non-standard error messages in the unified log, the management controller may obtain an error message parser from the channel card. The error message parser may be obtained by the management controller and via a sideband channel to reduce a likelihood of compromise of the hardware components of the data processing system due to malware and/or other malicious software that may be present on the channel card. The error message parser may include mappings between non-standard error messages and standard error messages (e.g., error messages which are able to be read by the management controller and included in the unified log), and may be usable to modify non-standard error messages to obtain standard error messages. For example, the error message parser may include a translation table which may allow the management controller to convert the non-standard error messages to the standard error messages by modifying a type, format, and/or other characteristic of the non-standard error message so that it may be included in the unified log.

The management controller may also update a time clock of the channel card based on a master clock of the data processing system (e.g., via sideband channels) so that error messages generated by the channel card may be timestamped based on the master clock (e.g., a clock used to timestamp error messages from other hardware components of the hardware resources). By doing so, a unified log may be obtained by the management controller which includes the informational content of the non-standard error message and includes timestamps based on the master clock.

Thus, embodiments disclosed herein may address, among other technical problems, the technical challenge of generating a unified log which includes error messages associated with non-standard functions of channel cards of data processing systems. By using an error message parser to modify non-standard error messages to obtain standard error messages, a unified log may be obtained which may be used by a diagnostic system to determine a root cause for the error messages. The determination of the root cause may allow an action set to be performed to remediate the root cause, which may allow the desired computer-implemented services to continue to be provided.

In an embodiment, a method for managing operation of a data processing system is disclosed. The method may include: obtaining a non-standard error message from a channel card operably connected to the data processing system, the non-standard error message being associated with a non-standard function of the channel card based on standard functions of a type of the channel card; modifying the non-standard error message using an error message parser obtained from the channel chard and based on the non-standard function to obtain a standard error message, the error message parser including mappings between non-standard error messages and standard error messages; obtaining, using at least the standard error message, a unified log, the unified log including data regarding the operation of the data processing system and being based on a master clock of the data processing system; and providing the unified log to a diagnostic system responsible for determining a root cause for the non-standard error message.

The method may also include, prior to obtaining the non-standard error message and by a management controller of the data processing system: identifying that the channel card is operably connected to the data processing system; performing a function identification process for the channel card to identify at least the non-standard function of the channel card; obtaining the error message parser from the channel card, the error message parser being usable to modify non-standard error messages for the non-standard function to obtain standard error messages; and updating a time clock of the channel card based on the master clock to obtain an updated time clock.

The updating may be performed via sideband channels of the data processing system, and the updated time clock may be used by the channel card to timestamp non-standard error messages while the updated time clock is aligned to the master clock within predetermined criteria.

The data processing system may include a management controller separate from and tasked with managing operation of hardware resources of the data processing system, the hardware resources including the channel card and other hardware components.

The obtaining, the modifying, and the providing may be performed, at least in part, by the management controller.

The standard functions of the type of the channel card may be based on an industry standard with which the channel card is compliant.

The non-standard function may be a capability of the channel card that is additional to those of the industry standard.

The non-standard error message may include a timestamp based on a time clock of the channel card that is synced with the master clock within predetermined criteria.

The unified log may include a list of error messages and corresponding timestamps regarding the operation of the data processing system, the list of error messages including the non-standard error message.

The unified log may provide a global view of the operation of the data processing system that is based on an aggregation of error messages from hardware resources of the data processing system, the hardware resources including the channel card and other hardware components.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, including channel cards (e.g., graphics cards, network interface cards (NICs), accelerator cards, expansion cards).

While providing the computer-implemented services, a hardware resource of the data processing system may experience errors. The errors may be due to physical damage to the hardware resource, loss of power, overheating, data reading errors, data storage errors, and/or other types of malfunctions experienced during operation of the hardware resource. As a result of the error, the hardware resource may generate an error message including data regarding the error and a timestamp indicating when the error occurred. The error message may be provided to an entity which participates in managing operation of the data processing system (e.g., a management controller). The management controller may be responsible for receiving error messages generated by hardware resources due to being implemented using a separately controllable power domain from the hardware resources. Thus, if any and/or all of the hardware resources become unpowered (e.g., due to mechanical failure), the management controller may remain operable.

To manage operation of the data processing system, the management controller may aggregate error messages and corresponding timestamps obtained from various hardware resources to generate a unified log. The unified log may provide a global view of the operation of the data processing system and may be provided to a diagnostic system to be used to identify a root cause for the error messages generated by the hardware resources and/or may be used for other purposes.

For example, the hardware resources may include a cooling fan used to dissipate heat during operation of the data processing system. If the cooling fan becomes inoperable (e.g., becomes unpowered, experiences mechanical failure), an error message may be generated and provided to the management controller. Failure of the cooling fan may result in damage, failure, and/or other errors to be experienced by other hardware resources, such as a processor, due to overheating. The processor may provide an error message to the management controller, and the management controller may include the error messages (e.g., from the cooling fan and from the processor) in the unified log. Using the unified log, a diagnostic system may determine that the error message generated by the processor was caused by the failure of the cooling fan, and an action set may be performed to reduce a likelihood of further damage to the data processing system while providing the computer-implemented services (e.g., lower the clock rate frequency of the processor to reduce heat generation). By identifying the root cause for the error messages using the unified log, actions may be performed so that the computer-implemented services may continue to be provided.

In order to include the error messages in the unified log, the management controller may be prepared during manufacturing to include firmware, drivers, and/or configuration settings that enable the management controller to read and/or otherwise understand error messages generated by hardware resources included in the data processing system at the time of manufacturing (e.g., stock hardware components). For example, in order for the management controller to include error messages generated by a channel card in the unified log, a specialized firmware may be required to be installed which enables the management controller to map error messages to functions of the channel card. Thus, during setup (e.g., manufacturing) of the data processing system, the appropriate firmware, drivers, configuration data, and/or configuration settings that reflect functionality of existing (e.g., stock) hardware resources of the data processing system may be installed.

Over time (e.g., after manufacturing or setup), hardware resources such as channel cards may be modified (e.g., by an end user). For example, a stock channel card may be replaced with a channel card with non-standard functions, and/or channel cards with non-standard functions may be added to the data processing system. Functionality of the channel cards may vary to a high degree depending on the vendor (e.g., manufacturer of the channel card) and/or due to the programmable nature of some channel cards (e.g., SmartNICs, data processing unit (DPU) cards, etc.).

For example, channel cards may include programmable platform devices capable of performing various functions in various different ways and/or some may require special methods of communication (e.g., specialized application programming interfaces (APIs)). In other words, some functionality of the channel cards may (i) not adhere to an industry standard for similar types of channel cards, (ii) may be in addition to the functionality specified by the industry standard, and/or may otherwise require specialized or unusual information to utilize such functions. These functions may be referred to as non-standard functions.

As a result, the management controller may not include the appropriate firmware, drivers, configuration data, and/or configuration settings to understand error messages associated with the non-standard functions (e.g., non-standard error messages). Consequently, the unified log generated by the management controller may not include the non-standard error messages provided by the channel card, which may increase the difficulty of determining the root cause for error messages generated by hardware resources of the data processing system. An increase in difficulty of determining the root cause for error messages may result in an inability and/or delay in performing an action set to remediate the error messages, which may result in the computer-implemented services provided by the data processing system being interrupted, delayed, and/or of a reduced quality.

In general, embodiments disclosed herein may provide methods, systems, and/or devices for managing operation of a data processing system in a manner that facilitates use of channel cards with non-standard functions. During operation of the data processing system, the channel cards may generate error messages regarding the non-standard functions (e.g., non-standard error messages). To interpret the non-standard error messages, an error message parser may be used. The error message parser may include mappings between non-standard error messages and standard error messages (e.g., error messages in a format and/or configuration which allows them to be included in a unified log).

Using the error message parser, non-standard error messages obtained from the channel cards may be modified to obtain standard error messages. The standard error messages may be included in a unified log and used by a diagnostic system to identify a root cause for the error messages. To do so, the data processing system may include out-of-band components such as a management controller. The management controller may be tasked with managing the unified log by utilizing (e.g., hosting and/or operating) the error message parser so that the unified log may be updated to include error messages regarding non-standard functions of channel cards. Additionally, the management controller may manage a time clock of the channel cards so that the time clock may be synced with the master clock (e.g., of the data processing system), which may be used to timestamp the error messages in a consistent manner.

By doing so, a system in accordance with an embodiment may be more likely to generate a unified log usable to determine a root cause for error messages generated by hardware resources. Using an error message parser, error messages regarding non-standard functions of a channel card may be included in the unified log. By syncing the time clock across hardware resources, the error messages included in the unified log may be timestamped based on the master clock, which may assist in establishing a timeline for the generation of error messages. The ability to identify a root cause for the error messages may increase a reliability of the computer-implemented services and may reduce delays in provisioning of the computer-implemented services for downstream consumers.

To perform the above-mentioned functionality, the system of FIG. 1A may include data processing system 102, diagnostic system 104, management controller 152, and/or hardware resources 150. Data processing system 102, any components thereof and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include any number of stock channel cards (e.g., installed by a manufacturer of data processing system 102 to perform standard functions) and/or non-standard channel cards (e.g., added by a user of data processing system 102 to perform non-standard functions in addition to standard functions based on current or preceding industry standards for a type of the non-standard channel cards). Channel cards 154 may function in cooperation with other components of hardware resources 150.

While providing the computer-implemented services, any of the hardware components of hardware resources 150 may experience any number and/or type of errors related to performance and/or component health. As a result of an error, a hardware component may generate an error message. For example, hardware resources 150 may include a central processing unit (CPU), which may generate error messages indicating system damage, instruction processing damage, invalid register, timing facility damage, and/or other error messages.

To manage the error messages generated by hardware resources 150, data processing system 102 may include management controller 152. To perform its functionality, management controller 152 may (i) register the operable connection of hardware components to data processing system 102 (e.g., identify the addition and/or removal of hardware components of hardware resources 150), (ii) obtain error messages from hardware resources 150, (iii) generate a unified log including a list of error messages and corresponding timestamps from hardware resources 150, (iv) provide the unified log to a diagnostic system responsible for determining a root cause for the error messages (e.g., diagnostic system 104), and/or (v) perform other tasks to manage error messages.

In order for management controller 152 to generate the unified log, management controller 152 may be configured (e.g., during setup and/or manufacturing) to read error messages provided by hardware resources 150 and convert the error messages into a corresponding entry in the unified log. For example, channel card 154A may be a graphics card installed by the manufacturer which performs standard functions (e.g., a stock graphics card). Management controller 152 may be configured to associate the standard functions of the graphics card with error messages. For example, the graphics card may include functionality for multi-display use. If the graphics card experiences an error while connecting to multiple displays, an error message may be provided to management controller 152. Management controller 152 may recognize the error message and associated function (e.g., multi-display use), and may update the unified log to include information related to the error message. The information related to the error message may include: (i) an identifier for the hardware component (e.g., the graphics card), (ii) a timestamp associated with the error message, (iii) information content of the error message (e.g., a multi-display use failure), (iv) the error message itself, and/or (v) other information.

However, channel cards with non-standard functions may generate error messages that management controller 152 was not configured to read (e.g., non-standard error messages). In order to manage non-standard error messages, management controller 152 may (i) perform a function identification process (e.g., to identify whether the channel card includes non-standard functions), and/or (ii) obtain an error message parser from the channel card. Therefore, if management controller 152 identifies a non-standard error message, management controller 152 may (i) modify the non-standard error message using the error message parser to obtain a standard error message, (ii) enter the standard error message into the unified log, and/or (iii) perform other tasks to manage the non-standard error messages. For additional details regarding the error message parser, refer to the discussion of FIGS. 2A-2B.

To provide the unified log to diagnostic system 104, management controller 152 may establish connections with diagnostic system 104. Diagnostic system 104 may include any number of systems which may be remote to data processing system 102 and may provide diagnostic and/or other management services for data processing system 102. To perform its functionality, diagnostic system 104 may (i) obtain unified logs for data processing system 102 (e.g., from management controller 152 and via an out-of-band communication channel), (ii) parse the unified logs to determine root causes for error messages (e.g., establish a timeline for error messages, use the timeline to determine a source of the errors experienced by hardware components of hardware resources 150), (iii) provide an action set to remediate the error messages based on the unified logs (e.g., to management controller 152 and via the out-of-band communication channel), and/or (iv) perform other tasks.

While described with respect to diagnostic system 104 being remote to data processing system 104, it will be appreciated that diagnostic system 104 may not be remote to data processing system 104. For example, management controller 152 may also perform the functions of diagnostic system 104.

Additionally, management controller 152 may update a time clock of the channel cards based on a master clock (e.g., of data processing system 102), which may allow management controller 152 to update the unified log to include error messages with corresponding timestamps based on the master clock across all of hardware resources 150.

Management controller 152 may be distinct from and/or may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. For example, the agent may facilitate the communication of error messages between hardware resources 150 and management controller 152. Refer to the discussion of FIG. 1B for more information regarding the functionality of management controller 152.

Figure 2A:
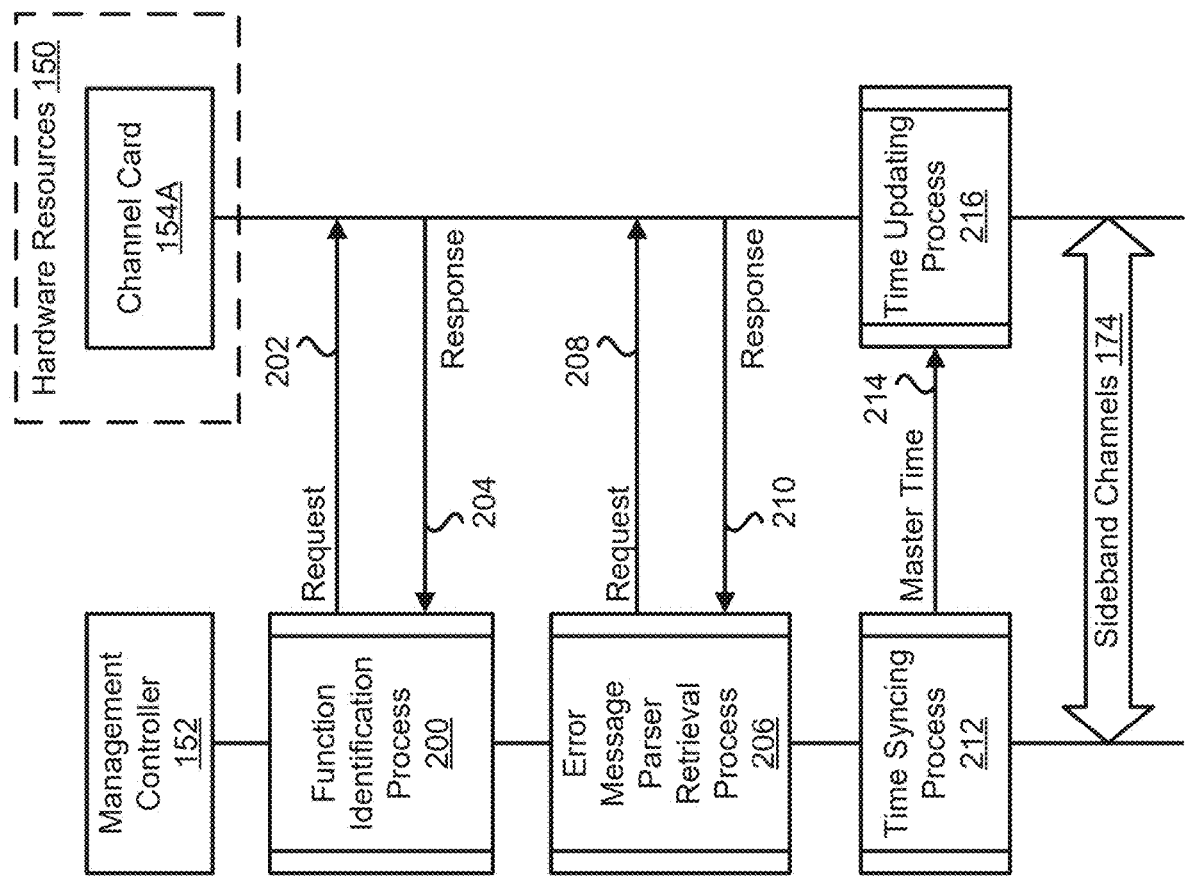
FIG. 2A shows an interaction diagram in accordance with an embodiment.
Figure 2B:
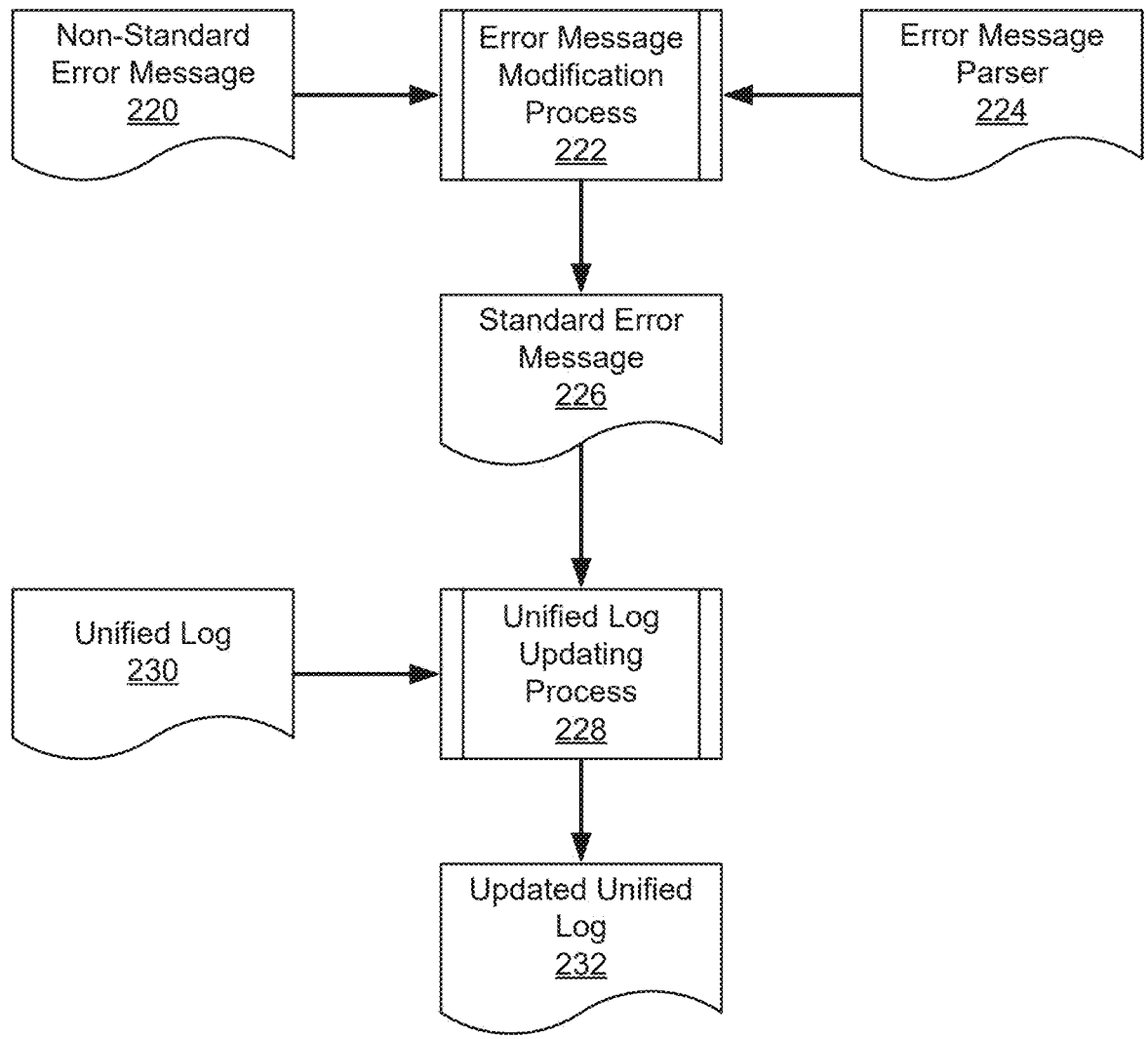
FIG. 2B shows a diagram illustrating a data flow in accordance with an embodiment.
Figure 3:
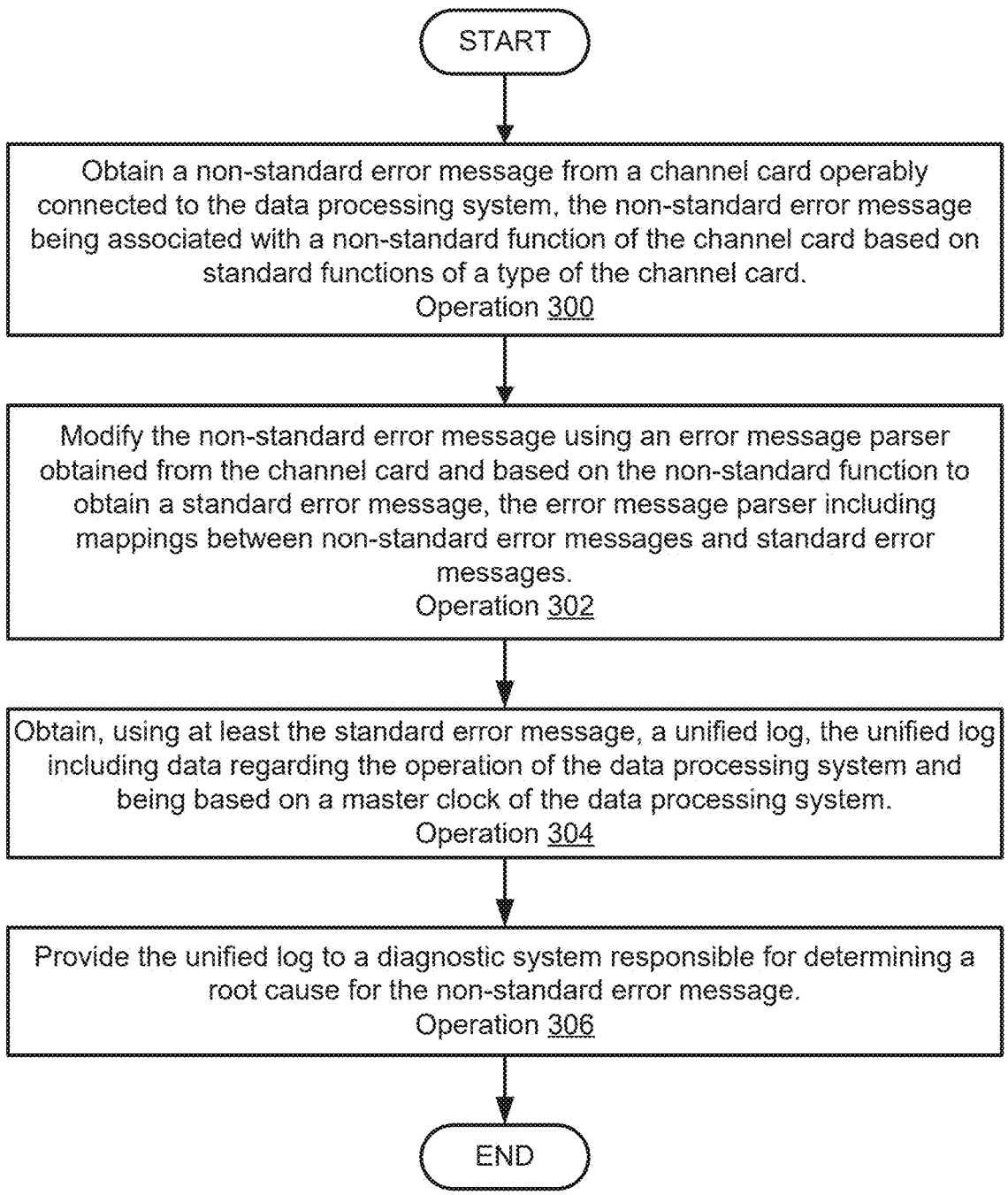
FIG. 3 shows a flow diagram illustrating a method of managing a data processing system in accordance with an embodiment.

When providing their functionality, any components of data processing system 102 may perform all, or a portion of the actions and methods illustrated in FIGS. 2A-3.

Any of data processing system 102 (and/or components thereof) and diagnostic system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. Communication system 106 may facilitate communications between the components of FIG. 1A. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

Figure 1B:
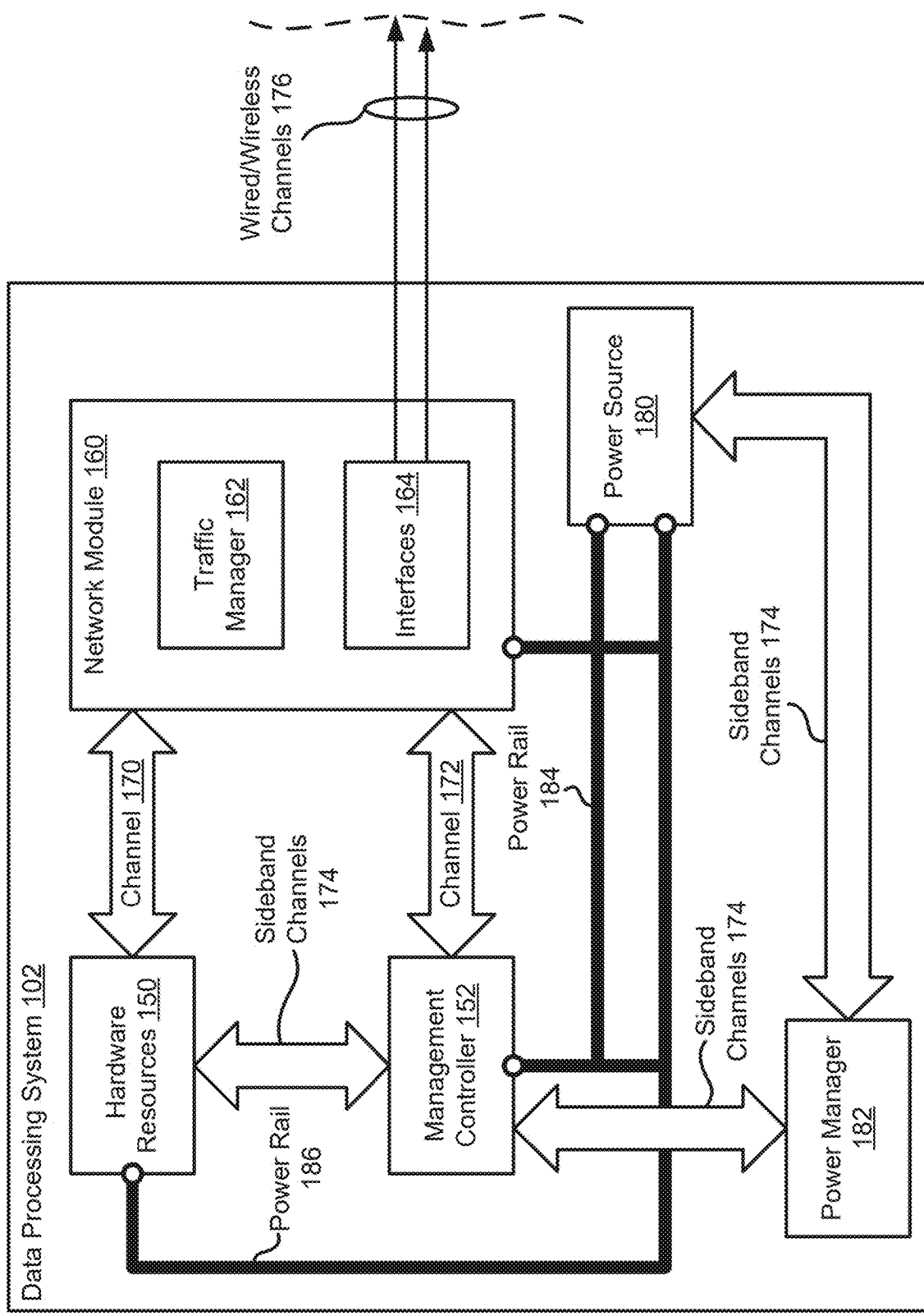
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). Management controller 152 may provide various management functionalities for data processing system 102. For example, management controller 152 may monitor various ongoing processes performed by the in-band components, may manage power distribution, may participate in thermal management, and/or other may perform other functions, such as generating logs regarding the operation of components of data processing system 102 (e.g., a unified log).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may obtain error messages generated by hardware resources 150. Additionally, management controller 152 may use sideband channels 174 to update a time clock of any of the components of hardware resources 150, which may allow the time clock to be synced with a master clock of data processing system 102.

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities, that may independently addressable, and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

While illustrated in FIG. 1B with a limited number of specific components, a system may include additional, fewer, and/or different components without departing from embodiments disclosed herein.

To further clarify embodiments disclosed herein, an interaction diagram in accordance with an embodiment is shown in FIG. 2A. The interaction diagram may illustrate an example of how data may be obtained and used within the systems of FIGS. 1A-1B. In the example shown in FIG. 2A, a data processing system (e.g., 102) may include components such as hardware resources 150 and management controller 152. Hardware resources 150 may include channel card 154A. The components of the data processing system may be similar to and/or include functionality similar to those described with respect to FIGS. 1A-1B.

In the interaction diagram, processes performed by and interactions between components of a system in accordance with an embodiment are shown. In the diagram, components of the system are illustrated using a first set of shapes (e.g., 152, 154A, etc.), located towards the top of each figure. Lines descend from these shapes. Processes performed by the components of the system are illustrated using a second set of shapes (e.g., 200, 206, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in an arrow. Lines terminating in an arrow may indicate that one-way interactions (e.g., data transmission from a first component to a second component) occur.

Generally, the processes and interactions are temporally ordered in an example order, with time increasing from the top to the bottom of each page. For example, the interaction labeled as 202 may occur prior to the interaction labeled as

204. However, it will be appreciated that the processes and interactions may be performed in different orders, any may be omitted, and other processes or interactions may be performed without departing from embodiments disclosed herein.

Turning to FIG. 2A, an interaction diagram in accordance with an embodiment is shown. The interaction diagram may illustrate processes and interactions that may occur when a channel card with at least one non-standard function (e.g., channel card 154A) is operably connected to a data processing system. When channel card 154A is operably connected to the data processing system, (i) non-standard functions of channel card 154A may be identified, (ii) an error message parser may be obtained from channel card 154A, and (iii) a time clock of channel card 154A may be synced with a master clock of the data processing system.

To identify the non-standard functions of channel card 154A, management controller 152 may perform function identification process 200. Function identification process 200 may include at least interactions 202 and 204. Function identification process 200 may be initiated by management controller 152 based on information obtained during startup of the data processing system. For example, during startup of the data processing system, management controller 152 may identify that a new hardware component is present in the system (e.g., during a secured component verification process and/or via a notification from a startup management entity). The identification of the new hardware component (e.g., channel card 154A) may prompt management controller 152 to perform function identification process 200.

During function identification process 200, management controller 152 may request and/or obtain information from channel card 154A. Channel card 154A may include a non-standard channel card, which may include capabilities to perform standard functions of the type of the channel card (e.g., based on an industry standard with which the channel card is compliant) and at least one non-standard function (e.g., additional to those of the industry standard). For example, channel card 154A may be installed to the data processing system after its time of manufacturing and/or after a recent setup of the data processing system; therefore, management controller 152 may not include appropriate firmware, drivers, and/or other software necessary to understand error messages generated by channel card 154A associated with at least a portion of the functions offered by channel card 154A (e.g., the non-standard functions).

To identify functions offered by channel card 154A, management controller 152 may provide a request for information to channel card 154A at interaction 202. Management controller 152 may provide the request by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes. The request may be provided, for example, via sideband channels 174. By providing the request to channel card 154A, channel card 154A may provide information usable for identifying non-standard functions of channel card 154A.

Channel card 154A may include hardware components such as memory, processors, etc., and may include a discovery protocol. For example, the information requested from channel card 154A may include, for example, a request for (i) identifying information of channel card 154A (e.g., a model number, a card type), (ii) functions of channel card 154A (e.g., functionalities channel card 154A is capable of performing), (iii) interface elements of channel card 154A, and/or (iv) other information regarding channel card 154A. Channel card 154A may read the request and obtain a response to the request.

For example, if channel card 154A supports discovery by management controller 152, then the response may include a list of functions supported by channel card 154A. Otherwise, for example, if channel card 154A does not support discovery by management controller 152, the response may include identifying information for channel card 154A.

At interaction 204, the response may be provided to management controller 152 by channel card 154A (e.g., via sideband channels 174) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes. Upon obtaining the response, management controller 152 may continue performance of function identification process 200.

Management controller 152 may read the response to identify non-standard functions for channel card 154A. To do so, management controller 152 may identify a type of channel card 154A (e.g., a class of channel cards such as a graphics card) and/or a list of functions of channel card 154A. This information may be included in the response, and/or may be obtained from a remote system or device (e.g., a manufacturer's system) based on other identifying information for channel card 154A included in the response. For example, management controller 152 may use out-of-band communication channels to communicate with the remote system or device to obtain a card type and/or a list of functions of channel card 154A.

During function identification process 200, management controller 152 may use the list of functions and the card type to identify the non-standard functions of channel card 154A. For example, management controller 152 may compare the list of functions with a list of industry standard functions for the card type. The non-standard functions may include capabilities of channel card 154A that are additional to those of the industry standard (e.g., that are not found on the list of industry standard functions for the card type). Management controller 152 may not include capabilities to read and/or otherwise understand error messages generated by channel card 154A associated with the non-standard functions (e.g., non-standard error messages).

For example, channel card 154A may include a performance sound card. Prior to a user installing the performance sound card to the data processing system, the data processing system may have been configured to use an integrated sound card for audio transmission. The integrated sound card may include standard functions such as generating and recording audio; therefore, management controller 152 may be configured to read error messages received from channel card 154A associated with generating and/or recording audio (e.g., standard error messages). However, the performance sound card may include non-standard functions in addition to the standard functions, such as data caching and/or data processing, and management controller 152 may not be configured to read error messages associated with such non-standard functions from channel card 154A (e.g., non-standard error messages).

To provide functionality for reading non-standard error messages from channel card 154A, error message parser retrieval process 206 may be performed. Error message parser retrieval process 206 may include at least interactions 208 and 210. During error message parser retrieval process 206, an error message parser may be obtained from channel card 154A. The error message parser may be usable to modify non-standard error messages (e.g., error messages associated with non-standard functions) to obtain standard error messages.

The error message parser may include a data structure stored on channel card 154A (e.g., in local memory) that maps non-standard error messages to standard error messages. For example, the error message parser may include a translation table usable to convert non-standard error messages into a type, format, and/or to include other characteristics which allows the non-standard error message to be readable by management controller 152 while maintaining the informational content of the non-standard error message (and/or may include a program which uses the translation table to convert the non-standard error messages).

Continuing with the above example, the performance sound card may include non-standard functions such as data caching functions. During use, the performance sound card may experience an error when attempting to cache an audio file. As a result of the error, the performance sound card may generate a caching error message. The error message parser may be used (e.g., by management controller 152) to map the caching error message to a standard error message format.

To obtain the error message parser, management controller 152 may provide a request for the error message parser to channel card 154A at interaction 208. Management controller 152 may provide the request (e.g., via sideband channels 174) by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes.

The error message parser may be stored in a local memory of channel card 154A and/or another storage location used by channel card 154A. At interaction 210, the error message parser may be provided to management controller 152 in a response from channel card 154A (e.g., via sideband channels 174) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes.

While described in FIG. 2A with respect to obtaining the error message parser from the channel card, it will be appreciated that the management controller may obtain the error message parser from any other entity (e.g., a remote entity) and/or from other storage locations. For example, the management controller may use identifying information for the channel card (e.g., a model number, a card type) obtained during the function identification process to perform a lookup in a database of error message parsers for channel cards. The management controller may then obtain the error message parser from the database via an out-of-band communication channel.

Management controller 152 may also perform time syncing process 212. During time syncing process 212, a time clock of channel card 154A may be updated based on a master clock of the data processing system. To perform time syncing process 212, management controller 152 may provide the master time based on the master clock to channel card 154A at interaction 214 (e.g., via sideband channels 174) along with instructions for updating the time clock of channel card 154A. Channel card 154A may then use the master time to perform time updating process 216, during which the time clock of channel card 154A may be updated to be aligned to the master clock within predetermined criteria (e.g., within a difference threshold). The updated time clock may be used by channel card 154A to timestamp non-standard error messages.

Clock synchronization across components (e.g., hardware components of hardware resources 150) of the data processing system may allow for error messages generated by any of hardware resources 150 to include timestamps based on the master clock. In doing so, an ordering of error messages based on the time the error message was generated may be obtained. For example, if channel card 154A timestamped error messages based on a different clock than the clock used by other components of the data processing system, it may be difficult and/or impossible to establish a timeline which accurately reflects the order in which the error messages were generated, which may increase the difficulty of determining a root cause for the error messages.

Thus, the processes and interactions shown in FIG. 2A may be used to obtain error message parsers from channel cards with non-standard functions. The error message parsers may be usable to modify non-standard error messages to obtain standard error messages. Additionally, a time clock of the channel card may be synced with a master clock, which may allow error messages generated by the channel card to be timestamped based on the master clock.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

To further clarify embodiments disclosed herein, a data flow diagram in accordance with an embodiment is shown in FIG. 2B. In this diagram, flows of data and processing of data are illustrated using different sets of shapes. A first set of shapes (e.g., 220, 224) is used to represent data structures, and a second set of shapes (e.g., 222, 228) is used to represent processes performed using and/or that generate data.

Turning to FIG. 2B, a data flow diagram in accordance with an embodiment is shown. The data flow diagram may illustrate data used in and data processing performed in updating a unified log for a data processing system, which may include non-standard error messages associated with a non-standard function of a channel card.

To update the unified log, non-standard error message 220 may be obtained by management controller 152 from a channel card (e.g., via a sideband channel). Non-standard error message 220 may be associated with a non-standard function of the channel card and may be of a type, format, and/or may include other characteristics which management controller 152 is not configured to read. Non-standard error message 220 may also include a timestamp based on a time clock of the channel card that is synced with the master clock within predetermined criteria. Refer to FIG. 2A for additional details regarding clock synchronization.

For example, a stock graphics card of a data processing system may be replaced with a non-standard graphics card. The non-standard graphics card may include standard functions, such as three-dimensional rendering, two-dimensional graphics, video decoding, television output, and/or multi-monitor use, and at least one non-standard function, such as virtual reality gaming capabilities. Management controller 152 may be configured to read error messages associated with the standard functions (e.g., standard error messages). For example, a standard error message may include information regarding issues encountered by the channel card while performing 3D rendering functions. A non-standard error message may include information regarding issues encountered by the channel card while performing virtual reality gaming functions. Management controller 152 may not recognize the non-standard function and/or may otherwise be unable to understand the non-standard error message.

In order to read non-standard error messages, management controller 152 may perform error message modification process 222. During error message modification process 222, non-standard error message 220 may be modified using error message parser 224 to obtain standard error message 226. Standard error message 226 may include similar informational content as non-standard error message 220 regarding the error, but may be of a type, format, and/or may include other characteristics which management controller 152 is configured to read. Refer to FIG. 2A for additional details regarding the error message parser.

Standard error message 226 may be used to perform unified log updating process 228. During unified log updating process 228, unified log 230 may be updated to include information from standard error message 226 to obtain updated unified log 232. Unified log 230 may include data regarding the operation of the data processing system and may be based on a master clock of the data processing system. For example, unified log 230 may include a list of error messages and corresponding timestamps (e.g., based on the master clock), which may include an aggregation of error messages from various components of hardware resources 150 of the data processing system obtained over a duration of time. For example, unified log 230 may include error messages generated by processors, memory modules, channel cards, and/or other components of the data processing system. Each of the error messages generated by any component of the data processing system may be time-stamped based on the master clock.

Updated unified log 232 may include the data included in unified log 230, with the addition of the data included in standard error message 226. In doing so, updated unified log 232 may provide a global view of the operation of the data processing system, which may include data regarding the operation of channel cards with non-standard functions.

Continuing with the above example, management controller 152 may modify the non-standard error message regarding the virtual reality gaming function using an error message parser obtained from the non-standard graphics card to obtain a standard error message. Management controller 152 may input the data included in the standard error message into a unified log for the data processing system. The unified log may include data from previously obtained error messages, which may include any number of error messages regarding the standard functions of the non-standard graphics card.

Updated unified log 232 may be provided to a diagnostic system (e.g., a remote entity which provides diagnostic and/or other management services for the data processing system) responsible for determining a root cause for non-standard error message 220 (not shown). Based on updated unified log 232, an action set may be performed to remediate non-standard error message 220 to facilitate provisioning of the computer-implemented services. Continuing with the above example, a user of the data processing system including the non-standard graphics card may be unable to use the computer-implemented gaming services provided by the data processing system. The user may contact a technical support team for assistance, which may obtain the unified log from management controller 152 (e.g., via an out-of-band communication channel). Using the unified log, the technical support team may determine the error message regarding the virtual reality gaming function is due to an outdated graphics driver. The user and/or technical support team may then perform a graphics driver updating process, which may allow the computer-implemented gaming services to be provided.

Thus, by implementing the data flow shown in FIG. 2B, a system in accordance with embodiments disclosed herein may be used to update a unified log for a data processing system to include non-standard error messages. By updating the unified log to include error messages regarding non-standard functions of channel cards, a diagnostic system may determine a root cause for the non-standard error messages. An action set may then be performed to remediate the non-standard error messages, which may facilitate provision of the computer-implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage the operation of data processing systems. FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method in accordance with an embodiment is shown. The flow diagram may illustrate various operations performed while managing operation of a data processing system. The data processing system may include hardware resources and a management controller, and may be similar to the data processing system discussed with respect to FIGS. 1A-1B.

At operation 300, a non-standard error message may be obtained from a channel card operably connected to the data processing system, the non-standard error message being associated with a non-standard function of the channel card based on standard functions of a type of the channel card. For example, standard functions of the type of the channel card may be based on an industry standard with which the channel card is compliant, and the non-standard function may be a capability of the channel card that is additional to those of the industry standard. The non-standard error message may be of a type, format, and/or may include other characteristics which a managing entity of the data processing system (e.g., a management controller) may not be configured to read. The non-standard error message may also include a timestamp based on a time clock of the channel card that is synced with a master clock within predetermined criteria.

Obtaining the non-standard error message may include (i) receiving the non-standard error message via a message from the channel card (e.g., via a sideband channel), (ii) reading the non-standard error message from a storage location used by the channel card, (iii) receiving the non-standard error message via a publish-subscribe system (e.g., by subscribing to updates from the channel card), and/or (iv) other methods.

Prior to operation 300, an error message parser may be obtained by the management controller of the data processing system. Obtaining the error message parser may include (i) identifying that the channel card is operably connected to the data processing system, (ii) performing a function identification process for the channel card to identify at least the non-standard function, (iii) obtaining the error message parser from the channel card, and/or (iv) other methods.

Identifying that the channel card is operably connected to the data processing system may include (i) detecting the connection of the channel card during a secured component verification process, (ii) receiving a notification from a startup management entity indicating the connection of the channel card, and/or (iii) other methods.

Performing the function identification process may include methods similar to those discussed with respect to function identification process 200 of FIG. 2A. For example, performing the function identification process may include (i) obtaining a list of functions of the channel card and (ii) comparing the list of functions of the channel card to a list of industry standard functions for the type of the channel card to identify any non-standard functions of the channel card.

Obtaining the error message parser may include (i) receiving the error message parser via a message from the channel card (e.g., via a sideband channel), (ii) reading the error message parser from a storage location used by the channel card, (iii) performing a lookup in a database of error message parsers followed by retrieval of the error message parser from the database, and/or (iv) other methods. Obtaining the error message parser may also include storing a data structure in the management controller which includes mappings between non-standard error messages and standard error messages. For example, the data structure may be stored in local memory of the management controller. Storing the data structure may include obtaining the data structure and instructions for performing a storage process and/or performing the storage process.

Prior to operation 300, a time clock of the channel card may also be updated based on a master clock of the data processing system to obtain an updated time clock. Updating the time clock of the channel card may include (i) providing a time based on the master clock to the channel card via sideband channels of the data processing system (e.g., by the management controller), (ii) performing a clock synchronization process by the channel card, and/or (iii) other methods. Performing the clock synchronization process may include setting the time clock of the channel card to be aligned to the master clock within predetermined criteria. For example, the predetermined criteria may include a difference threshold indicating an acceptable difference between the updated time clock of the channel card and the master clock. The updated time clock may be used by the channel card to timestamp non-standard error messages.

At operation 302, the non-standard error message may be modified using an error message parser obtained from the channel card and based on the non-standard function to obtain a standard error message, the error message parser including mappings between non-standard error messages and standard error messages. Modifying the non-standard error message may include (i) identifying the error message parser for the channel card (e.g., from a repository of error message parsers for various channel cards of the data processing system), (ii) comparing the non-standard error message to mappings specified by the error message parser to identify whether a mapping exists for the non-standard error message, (iii) using the mapping to convert the non-standard error message to the standard error message, and/or (iv) other methods.

Comparing the non-standard error message to mappings specified by the error message parser may include performing a lookup in a translation table included in the error message parser to identify the standard error message associated with the non-standard error message.

Using the mapping to convert the non-standard error message to the standard error message may include modifying a type, format, and/or other characteristic of the non-standard error message so that it may be read and/or understood by the management controller.

At operation 304, a unified log may be obtained using at least the standard error message. The unified log may include data regarding the operation of the data processing system and may be based on a master clock of the data processing system. For example, the unified log may include a list of error messages and corresponding timestamps regarding the operation of the data processing system. The unified log may provide a global view of the operation of the data processing system that may be based on an aggregation of error messages from hardware resources of the data processing system (e.g., channel cards, other hardware components).

Obtaining the unified log may include (i) updating the unified log to include the data included in the standard error message, (ii) providing the standard error message to another entity responsible for storing and/or updating the unified log, and/or (iii) other methods.

At operation 306, the unified log may be provided to a diagnostic system responsible for determining a root cause for the non-standard error message. Providing the unified log to the diagnostic system may include (i) transmitting the unified log via a message (e.g., by the management controller and via an out-of-band communication channel), (ii) storing the unified log in a storage location for retrieval by the diagnostic system, (iii) publishing the unified log via a publish-subscribe system where the diagnostic system subscribes to updates from the data processing system thereby causing a copy of the unified log to be propagated to the diagnostic system, and/or (iv) other methods.

The diagnostic system (and/or another entity) may use the unified log to determine a root cause for the non-standard error message, and may provide an action set in response. The action set may be performed to remediate the non-standard error message to facilitate provisioning of computer-implemented services. For example, performing the action set may include (i) modifying use of the channel card and/or hardware resources of the data processing system, (ii) performing an update procedure to update software used by the channel card and/or hardware resources of the data processing system, and/or (iii) other actions.

The method may end following operation 306.

Thus, as illustrated above, embodiments disclosed herein may provide systems and methods usable to manage operation of a data processing system using error message parsers that facilitate use of channel cards with non-standard functions. The error message parsers may be managed and implemented independently from the hardware components by a management controller of the data processing system. By doing so, non-standard error messages regarding non-standard functions of channel cards may be included in a unified log, which may facilitate the determination of a root cause for the non-standard error messages.

Figure 4:
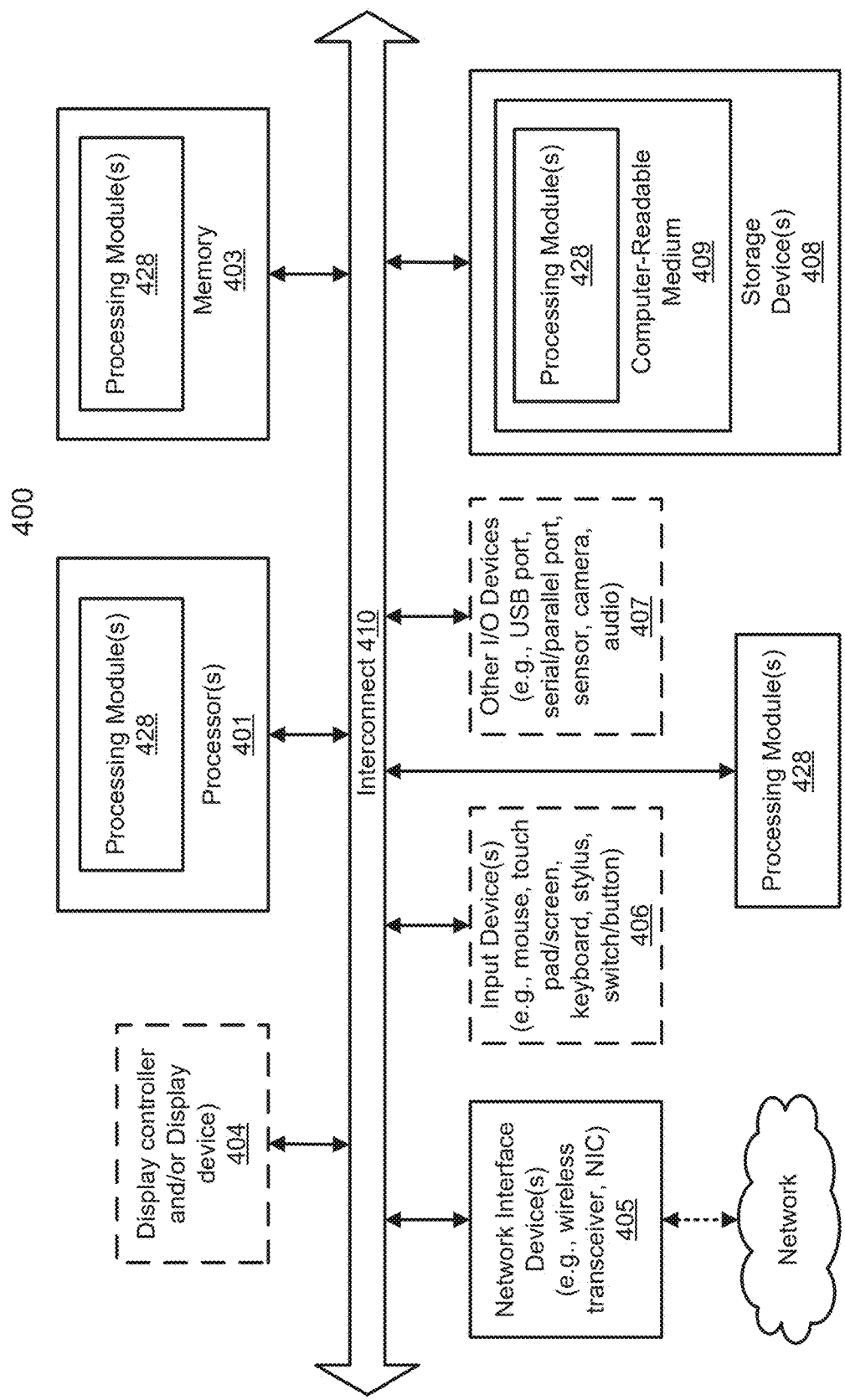
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    obtaining a non-standard error message from a channel card operably connected to the data processing system, the non-standard error message being associated with a non-standard function of the channel card based on standard functions of a type of the channel card;
    modifying the non-standard error message using an error message parser obtained from the channel card and based on the non-standard function to obtain a standard error message, the error message parser comprising mappings between non-standard error messages and standard error messages, and the error message parser being obtained prior to the obtaining of the non-standard error message;
    obtaining, using at least the standard error message, a unified log, the unified log comprising data regarding the operation of the data processing system and being based on a master clock of the data processing system; and
    providing the unified log to a diagnostic system responsible for determining a root cause for the non-standard error message.

2. The method of claim 1, further comprising:
    performing, based on the unified log, an action set to remediate the non-standard error message to facilitate provisioning of computer-implemented services.

3. The method of claim 1, further comprising:
    prior to obtaining the non-standard error message and by a management controller of the data processing system:
        identifying that the channel card is operably connected to the data processing system;
        performing a function identification process for the channel card to identify at least the non-standard function of the channel card;
        obtaining the error message parser from the channel card, the error message parser being usable to modify non-standard error messages for the non-standard function to obtain standard error messages; and
        updating a time clock of the channel card based on the master clock to obtain an updated time clock.

4. The method of claim 3, wherein the updating is performed via sideband channels of the data processing system, and the updated time clock is used by the channel card to timestamp non-standard error messages while the updated time clock is aligned to the master clock within predetermined criteria.

5. The method of claim 1, wherein the data processing system comprises a management controller separate from and tasked with managing operation of hardware resources of the data processing system, the hardware resources comprising the channel card and other hardware components.

6. The method of claim 5, wherein the obtaining, the modifying, and the providing are performed, at least in part, by the management controller.

7. The method of claim 1, wherein the standard functions of the type of the channel card are based on an industry standard with which the channel card is compliant.

8. The method of claim 7, wherein the non-standard function is a capability of the channel card that is additional to those of the industry standard.

9. The method of claim 1, wherein the non-standard error message comprises a timestamp based on a time clock of the channel card that is synced with the master clock within predetermined criteria.

10. The method of claim 1, wherein the unified log comprises a list of error messages and corresponding timestamps regarding the operation of the data processing system, the list of error messages comprising the non-standard error message.

11. The method of claim 1, wherein the unified log provides a global view of the operation of the data processing system that is based on an aggregation of error messages from hardware resources of the data processing system, the hardware resources comprising the channel card and other hardware components.

12. A non-transitory machine-readable medium having instructions stored therein, which when executed by a processor, cause the processor to perform operations for managing operation of a data processing system, the operations comprising:
    obtaining a non-standard error message from a channel card operably connected to the data processing system, the non-standard error message being associated with a non-standard function of the channel card based on standard functions of a type of the channel card;
    modifying the non-standard error message using an error message parser obtained from the channel card and based on the non-standard function to obtain a standard error message, the error message parser comprising mappings between non-standard error messages and standard error messages, and the error message parser being obtained prior to the obtaining of the non-standard error message;
    obtaining, using at least the standard error message, a unified log, the unified log comprising data regarding the operation of the data processing system and being based on a master clock of the data processing system; and providing the unified log to a diagnostic system responsible for determining a root cause for the non-standard error message.

13. The non-transitory machine-readable medium of claim 12, wherein the operations further comprise:

performing, based on the unified log, an action set to remediate the non-standard error message to facilitate provisioning of computer-implemented services.

14. The non-transitory machine-readable medium of claim 12, wherein the operations further comprise:

prior to obtaining the non-standard error message and by a management controller of the data processing system:
identifying that the channel card is operably connected to the data processing system;
performing a function identification process for the channel card to identify at least the non-standard function of the channel card;
obtaining the error message parser from the channel card, the error message parser being usable to modify non-standard error messages for the non-standard function to obtain standard error messages; and
updating a time clock of the channel card based on the master clock to obtain an updated time clock.

15. The non-transitory machine-readable medium of claim 14, wherein the updating is performed via sideband channels of the data processing system, and the updated time clock is used by the channel card to timestamp non-standard error messages while the updated time clock is aligned to the master clock within predetermined criteria.

16. The non-transitory machine-readable medium of claim 12, wherein the data processing system comprises a management controller separate from and tasked with managing operation of hardware resources of the data processing system, the hardware resources comprising the channel card and other hardware components.

17. A data processing system, comprising:
a processor; and
a memory coupled to the processor to store instructions, which when executed by the processor, cause the processor to perform operations for managing operation of the data processing system, the operations comprising:
obtaining a non-standard error message from a channel card operably connected to the data processing system, the non-standard error message being associated with a non-standard function of the channel card based on standard functions of a type of the channel card;
modifying the non-standard error message using an error message parser obtained from the channel card and based on the non-standard function to obtain a standard error message, the error message parser comprising mappings between non-standard error messages and standard error messages, and the error message parser being obtained prior to the obtaining of the non-standard error message;
obtaining, using at least the standard error message, a unified log, the unified log comprising data regarding the operation of the data processing system and being based on a master clock of the data processing system; and
providing the unified log to a diagnostic system responsible for determining a root cause for the non-standard error message.

18. The data processing system of claim 17, wherein the operations further comprise:

performing, based on the unified log, an action set to remediate the non-standard error message to facilitate provisioning of computer-implemented services.

19. The data processing system of claim 17, wherein the operations further comprise:

prior to obtaining the non-standard error message and by a management controller of the data processing system:
identifying that the channel card is operably connected to the data processing system;
performing a function identification process for the channel card to identify at least the non-standard function of the channel card;
obtaining the error message parser from the channel card, the error message parser being usable to modify non-standard error messages for the non-standard function to obtain standard error messages; and
updating a time clock of the channel card based on the master clock to obtain an updated time clock.

20. The data processing system of claim 19, wherein the updating is performed via sideband channels of the data processing system, and the updated time clock is used by the channel card to timestamp non-standard error messages while the updated time clock is aligned to the master clock within predetermined criteria.

* * * * *